United States Patent [19]
Castleman

[11] Patent Number: 5,862,578
[45] Date of Patent: Jan. 26, 1999

[54] INSERTION TOOL

[75] Inventor: Dennis J. Castleman, Monroeville, Ind.

[73] Assignee: Aeroquip Corporation, Maumee, Ohio

[21] Appl. No.: 821,765

[22] Filed: Mar. 20, 1997

[51] Int. Cl.$^6$ ................................................. B23P 19/02
[52] U.S. Cl. ................................. 29/235; 29/278; 29/280
[58] Field of Search .............................. 29/235, 270, 271, 29/278, 229, 280, 426.6

[56] References Cited

U.S. PATENT DOCUMENTS

| | | |
|---|---|---|
| 3,145,463 | 8/1964 | Hockett . |
| 3,180,015 | 4/1965 | Thompson et al. . |
| 3,553,817 | 1/1971 | Lallak . |
| 3,704,505 | 12/1972 | Lacer, Jr. et al. . |
| 4,141,129 | 2/1979 | Martini . |
| 4,222,161 | 9/1980 | Duval et al. . |
| 4,571,804 | 2/1986 | Grabler et al. . |
| 4,845,822 | 7/1989 | Hutson . |
| 5,050,282 | 9/1991 | Zannini . |
| 5,138,752 | 8/1992 | Tasner . |

FOREIGN PATENT DOCUMENTS

| | | |
|---|---|---|
| 0 137 907 A | 4/1985 | European Pat. Off. . |
| 24 44 896 | 9/1974 | Germany . |

OTHER PUBLICATIONS

G. Warnecke et al.: "Industrieroboter montiert kleine O-Ringe automatisch" VDI-Zeitschrift, vol. 133, No. 8, Aug. 1991, Dusseldorf, see figures 3,6.

*Primary Examiner*—Robert C. Watson
*Attorney, Agent, or Firm*—Emch, Schaffer, Schaub & Porcello Co., L. P. A.

[57] ABSTRACT

An insertion tool for insertion of a ring into a body defining an internal recess for receiving the ring including a ring holder and a plunger. The ring holder includes a ring end and a handle end. The ring end includes a stationary shoulder for engaging the body. The ring end includes at least one relief for receiving and positioning the ring. The ring holder defines a plunger channel extending between the ring and the handle ends. The plunger is slidingly positioned in the plunger channel. The plunger has a radius end adjacent the ring end and an actuation end adjacent the handle end. The radius end includes at least one radius for engaging the ring.

8 Claims, 16 Drawing Sheets

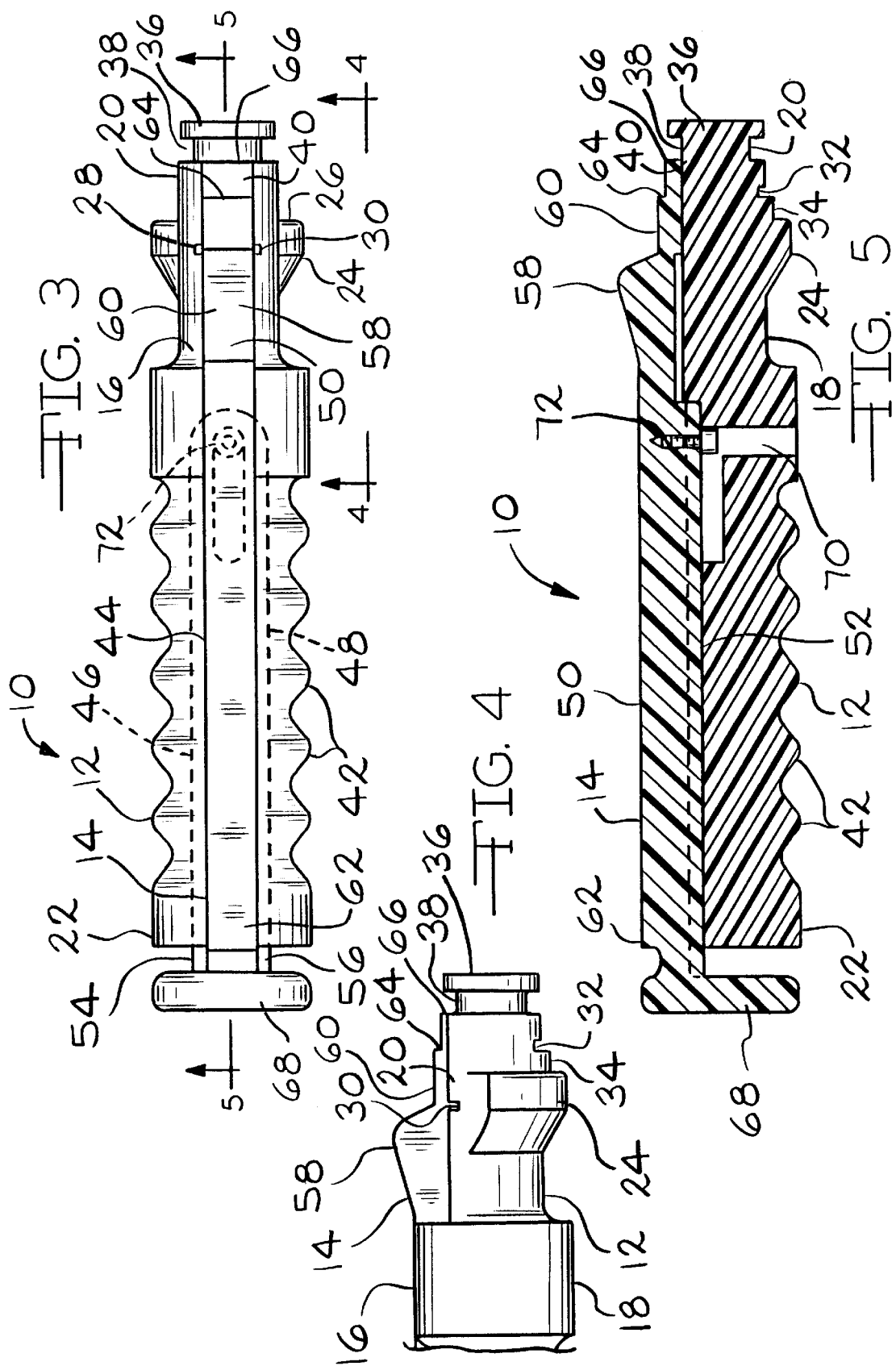

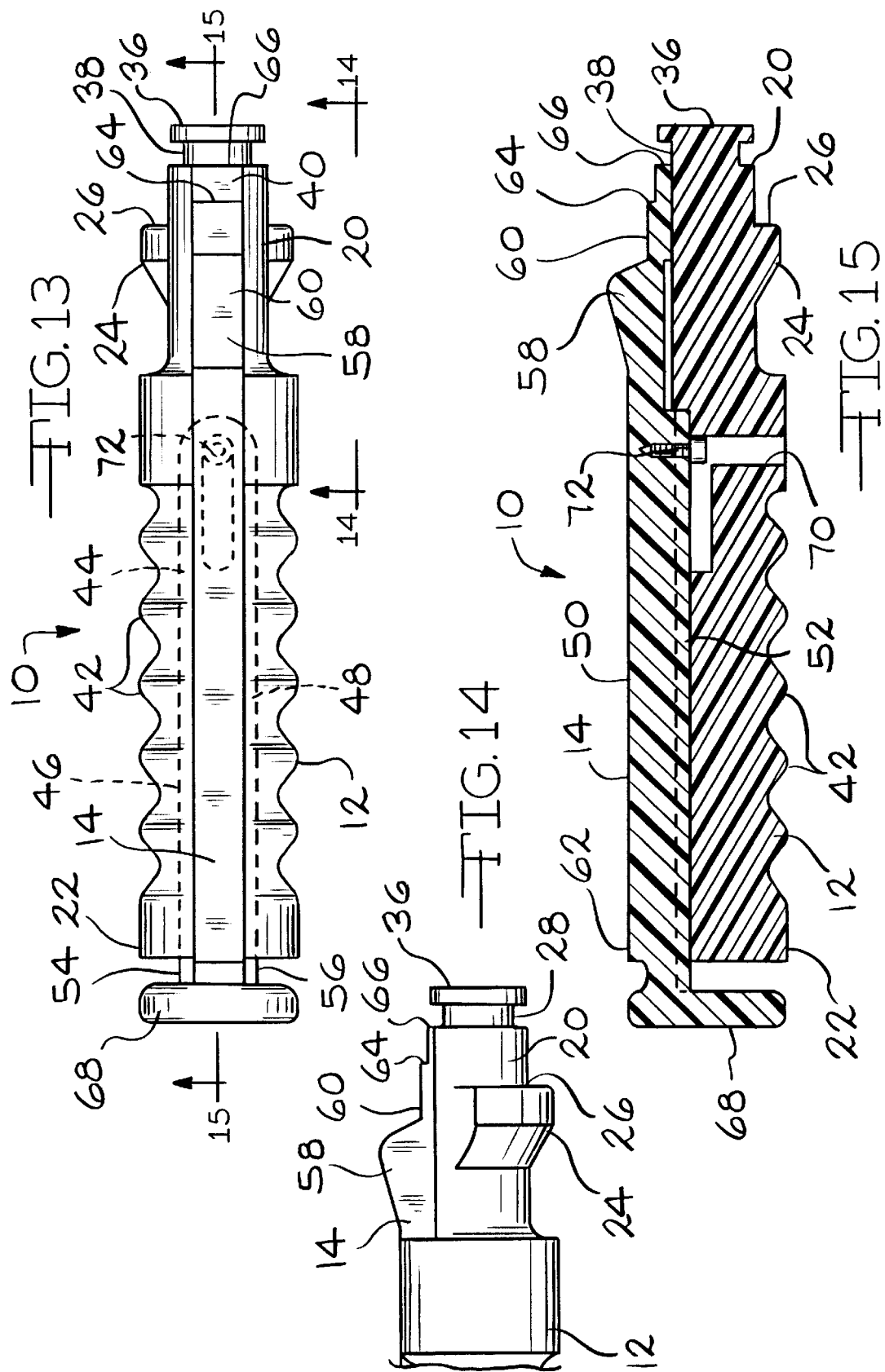

1

INSERTION TOOL

BACKGROUND OF THE INVENTION

The present invention is directed to an insertion tool for a ring into a body. More specifically, the invention is directed to an insertion tool for insertion of a ring into a body defining an internal recess for receiving the ring in which the tool includes a ring holder and a plunger slidingly positioned in a plunger channel defined by the ring holder.

Insertion tools for inserting O-rings and the like into bodies are known in the art. Examples of such tools are shown in U.S. Pat. Nos. 3,180,015; 3,553,817; 3,704,505; 4,222,161; 4,571,804; 5,050,282; and 5,138,752.

It has been found that there is a need for a relatively inexpensive insertion tool that can quickly and efficiently insert a back-up ring and an O-ring into a body that defines internal recesses for receiving the rings. There is also a need for an insertion tool that can insert a retaining ring with the back-up ring and the O-ring. The present invention satisfies these needs.

SUMMARY OF THE INVENTION

The present invention is directed to an insertion tool for insertion of a ring into a body defining an internal recess for receiving the ring. The tool includes a ring holder having a ring end and a handle end. The ring end includes a stationary shoulder for engaging the body. The ring end includes at least one relief for receiving and positioning the ring. The ring holder defines a plunger channel extending between the ring and handle ends. The tool further includes a plunger slidingly positioned in the plunger channel. The plunger has a radius end adjacent the ring end and an actuation end adjacent the handle end. The radius end includes at least one radius for engaging the ring.

In a preferred embodiment, the invention provides an insertion tool for insertion of a retaining ring, a back-up ring and an O-ring into a body defining internal recesses for receiving the rings. In this embodiment, the insertion tool includes a ring holder having a top and a bottom extending longitudinally between a ring end and a handle end. The ring end includes a stationary shoulder for engaging the body. The ring end further includes at least one upper retaining groove adjacent the top for positioning the retaining ring. The ring end further includes a lower retaining groove adjacent the bottom for positioning the retaining ring. The ring end further includes a small rib adjacent the bottom for positioning the retaining ring. The ring holder defines a plunger channel extending longitudinally between the ring and handle ends along the top. The insertion tool further includes a plunger having an upper portion and a lower portion slidingly positioned in the plunger channel. The plunger has a radius end adjacent the ring end and an actuation end adjacent the handle end. The radius end includes a retaining ring radius for engaging the retaining ring. The radius end further includes a back-up ring and an O-ring radius for engaging the back-up ring and the O-ring.

In another preferred embodiment, the present invention provides an insertion tool for insertion of a back-up ring and an O-ring into a body defining an internal recess for receiving the rings. In this embodiment, the insertion tool includes a ring holder having a top and a bottom extending longitudinally between a ring end and a handle end. The ring end includes a stationary shoulder for engaging the body. The ring end defines a diameter relief adapted to receive and support the back-up ring and the O-ring. The ring holder defines a plunger channel extending longitudinally between the ring and handle ends along the top. The insertion tool further includes a plunger having an upper portion and a lower portion slidingly positioned in the plunger channel. The plunger has a radius end adjacent the ring end and an actuation end adjacent the handle end. The radius end includes a back-up ring and an O-ring radius for engaging the back-up ring and the O-ring.

It is the primary object of the present invention to provide an insertion tool for the quick and efficient insertion of a ring into a body defining an internal recess for receiving the ring.

An important object of the present invention is to provide an insertion tool for the quick and efficient insertion of a retaining ring, a back-up ring and an O-ring into a body defining internal recesses for receiving the rings.

Another important object of the present invention is to provide an insertion tool for the quick and efficient insertion of a back-up ring and an O-ring into a body defining an internal recess for receiving the rings.

Other objects and advantages of the present invention shall become apparent to those skilled in the art upon a review of the following detailed description of the preferred embodiments and the accompanying drawings.

BRIEF DESCRIPTION OF THE DRAWINGS

FIG. 3 is a plan view of the insertion tool shown in FIG. 2;

FIG. 4 is a view taken along line 4—4 of FIG. 3;

FIG. 5 is a cross-sectional view taken along line 5—5 of FIG. 3;

FIG. 13 is a plan view of the insertion tool shown in FIG. 11;

FIG. 14 is a view taken along line 14—14 of FIG. 13;

FIG. 15 is a cross-sectional view taken along line 15—15 of FIG. 13;

DETAILED DESCRIPTION OF THE PREFERRED EMBODIMENTS

Figure 1:
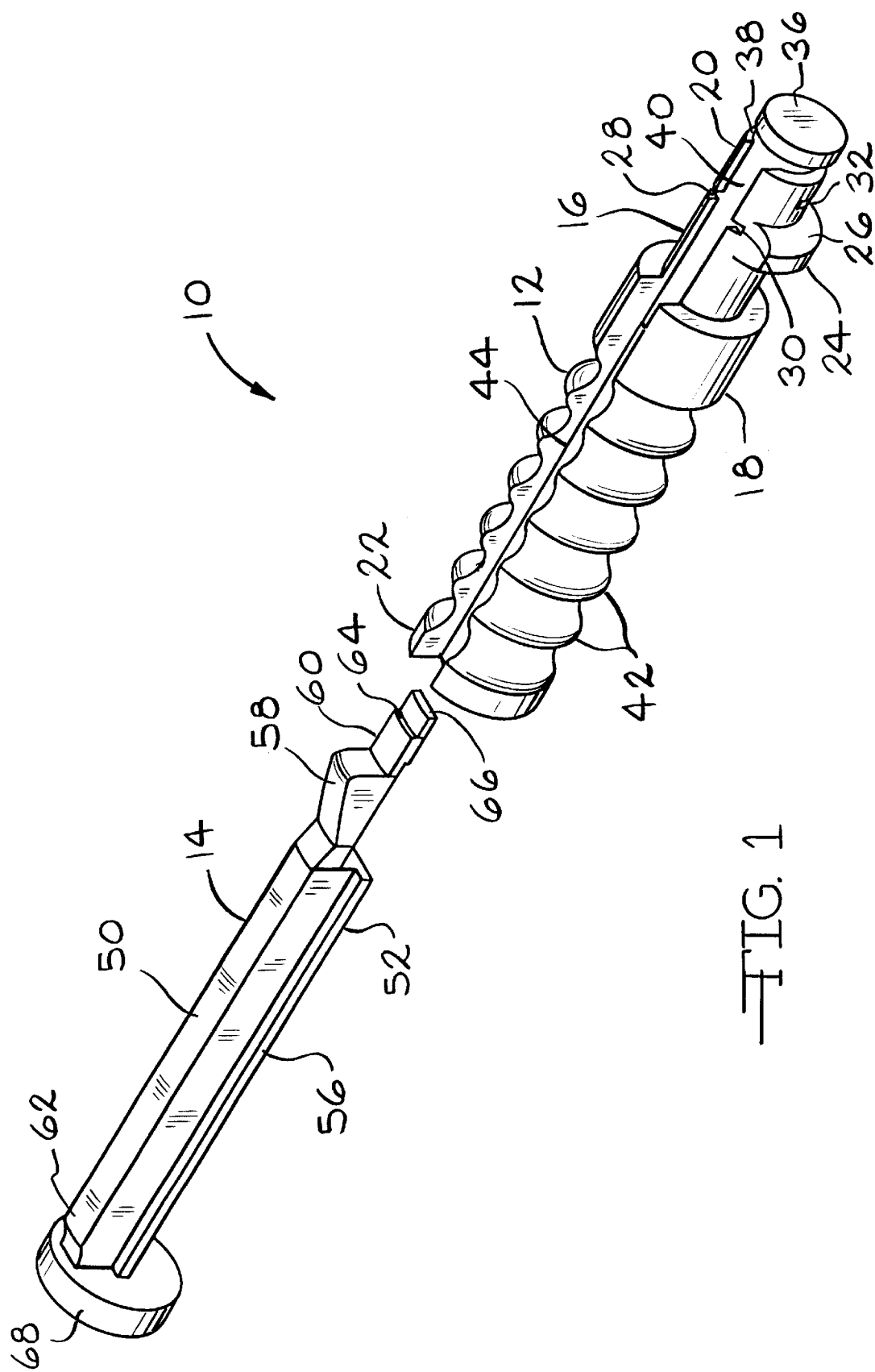
FIG. 1 is a perspective view of a first embodiment insertion tool according to the present invention showing the ring holder separated from the plunger.

The preferred embodiments and best mode of the present invention will now be described in detail with reference being made to the drawings. The insertion tool of the present invention is indicated generally in the drawings by the reference number "10".

Figure 2:
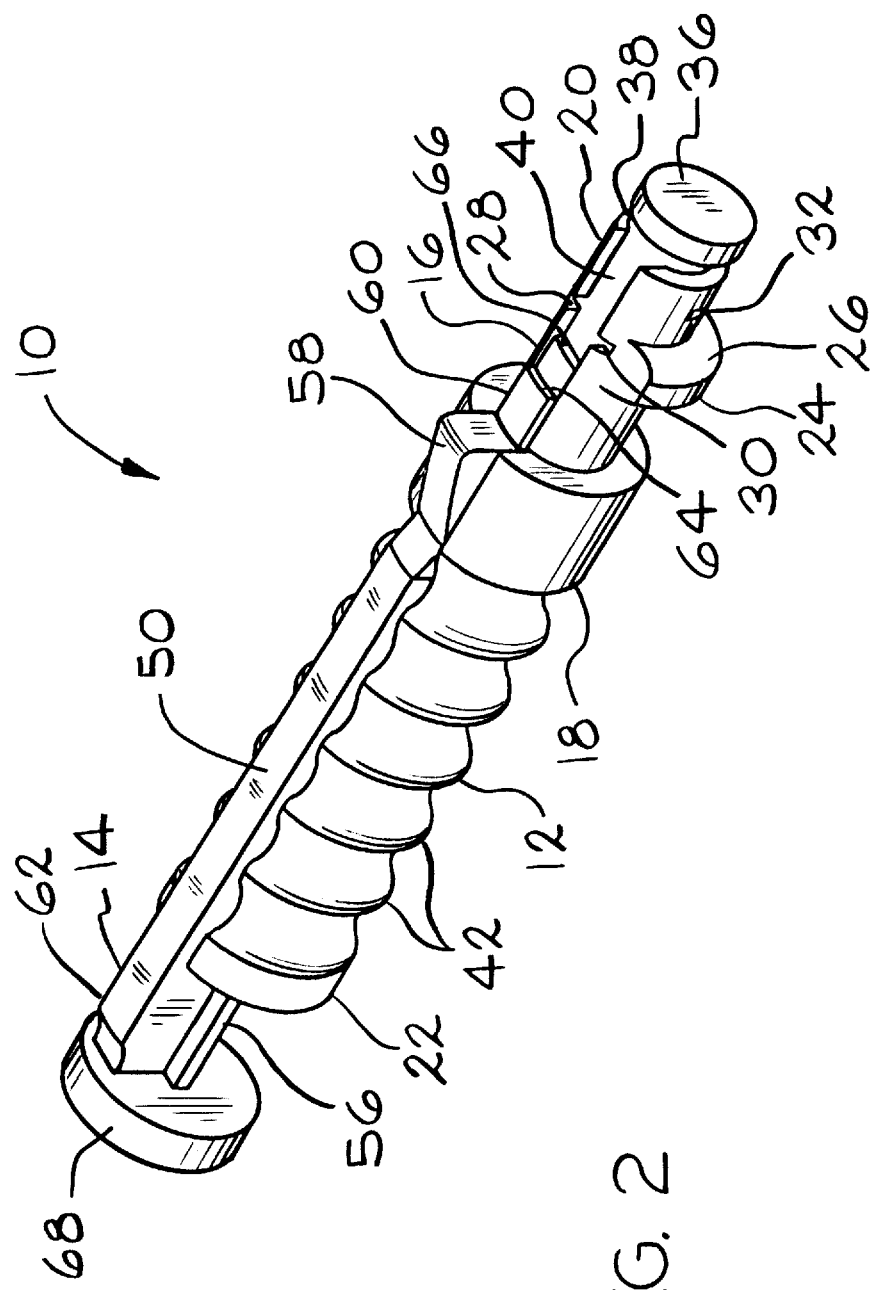
FIG. 2 is a perspective view similar to the view of FIG. 1 showing the plunger inserted in the ring holder.

The first embodiment insertion tool is shown in FIGS. 1–10. Referring to FIGS. 1–5, the insertion tool 10 includes a ring holder 12 and a plunger 14. The ring holder 12 has a top 16 and a bottom 18. The ring holder 12 extends longitudinally between a ring end 20 and a handle end 22. The ring end 20 includes a stationary shoulder 24. The stationary shoulder 24 includes a body engagement surface 26. The ring end 20 further includes a pair of upper retaining grooves 28 and 30 adjacent the top 16. The ring end 20 further includes a lower retaining groove 32 adjacent the bottom 18. As shown in FIGS. 4 and 5, the ring end 20 further includes a small rib 34 adjacent the bottom 18 and the lower retaining groove 32. The upper retaining grooves 28 and 30, the lower retaining groove 32 and the small rib 34 are sized and adapted to receive, position and support a retaining ring as described below. Still referring to FIGS. 1–5, the ring end 20 includes a tip 36. The ring end 20 defines a diameter relief 38 adjacent the tip 36. As described below, the diameter relief 38 is sized and adapted to receive a back-up ring and an O-ring. As shown in FIG. 2, a relief area 40 is defined by the ring end 20 adjacent the diameter relief 38. In the present embodiment, the relief area 40 is in direct communication with the diameter relief 38.

Referring to FIGS. 1 and 2, the handle end 22 of the ring holder 12 includes a plurality of spaced grips 42. The grips 42 are adapted to allow a person's hand (not shown) to firmly grip or hold the insertion tool 10 during use.

As shown in FIGS. 1, 3 and 5, the ring holder 12 defines a plunger channel 44 extending longitudinally between the ring and handle ends 20 and 22 along the top 16. The plunger channel 44 includes a pair of plunger flange recesses 46 and 48.

Referring to FIGS. 1–5, the plunger 14 includes an upper portion 50 and a lower portion 52. The plunger 14 is slidingly positioned in the plunger channel 44 defined by the ring holder 12. The plunger 14 includes a pair flanges 54 and 56 on the lower portion 52 that are received by the plunger flange recesses 46 and 48, respectively. The plunger flanges 54 and 56 slidingly engage the plunger flange recesses 46 and 48 to allow the plunger to move longitudinally and in proper alignment with respect to the ring holder 12. The upper portion 50 of the plunger 14 includes an engagement projection 58. The projection 58 can be engaged by a person's thumb or finger to position the plunger 14 with respect to the ring holder 12.

As shown in FIGS. 2–5, the plunger 14 has a radius end 60 adjacent the ring end 20 of the ring holder 12 and an actuation end 62 adjacent the handle end 22 of the ring holder. The radius end 60 includes a retaining ring radius 64. The radius end 60 further includes a back-up ring and an O-ring radius 66. As described below, the retaining ring radius 64 and the back-up ring and O-ring radius 66 are sized and adapted to engage a retaining ring and a back-up ring and O-ring, respectively, during insertion of the rings into a body.

As shown in FIGS. 1, 2, 3 and 5, the actuation end 62 of the plunger 14 includes a push plate 68. In this embodiment, the push plate 68 has a circular configuration that is sized and adapted to allow for a person's hand to engage the push plate to actuate or move the plunger 14.

The ring holder 12 and the plunger 14 are preferably comprised of a durable plastic material. This allows the insertion tool 10 to be relatively inexpensive as compared to prior art tools.

As shown in FIGS. 3 and 5, the ring holder 12 defines a screw recess 70 that receives a threaded metal screw 72. The screw 72 is used to maintain the plunger 14 in the ring holder 12. The screw 72 is also used to maintain the insertion depth of the plunger 14.

Figure 6:
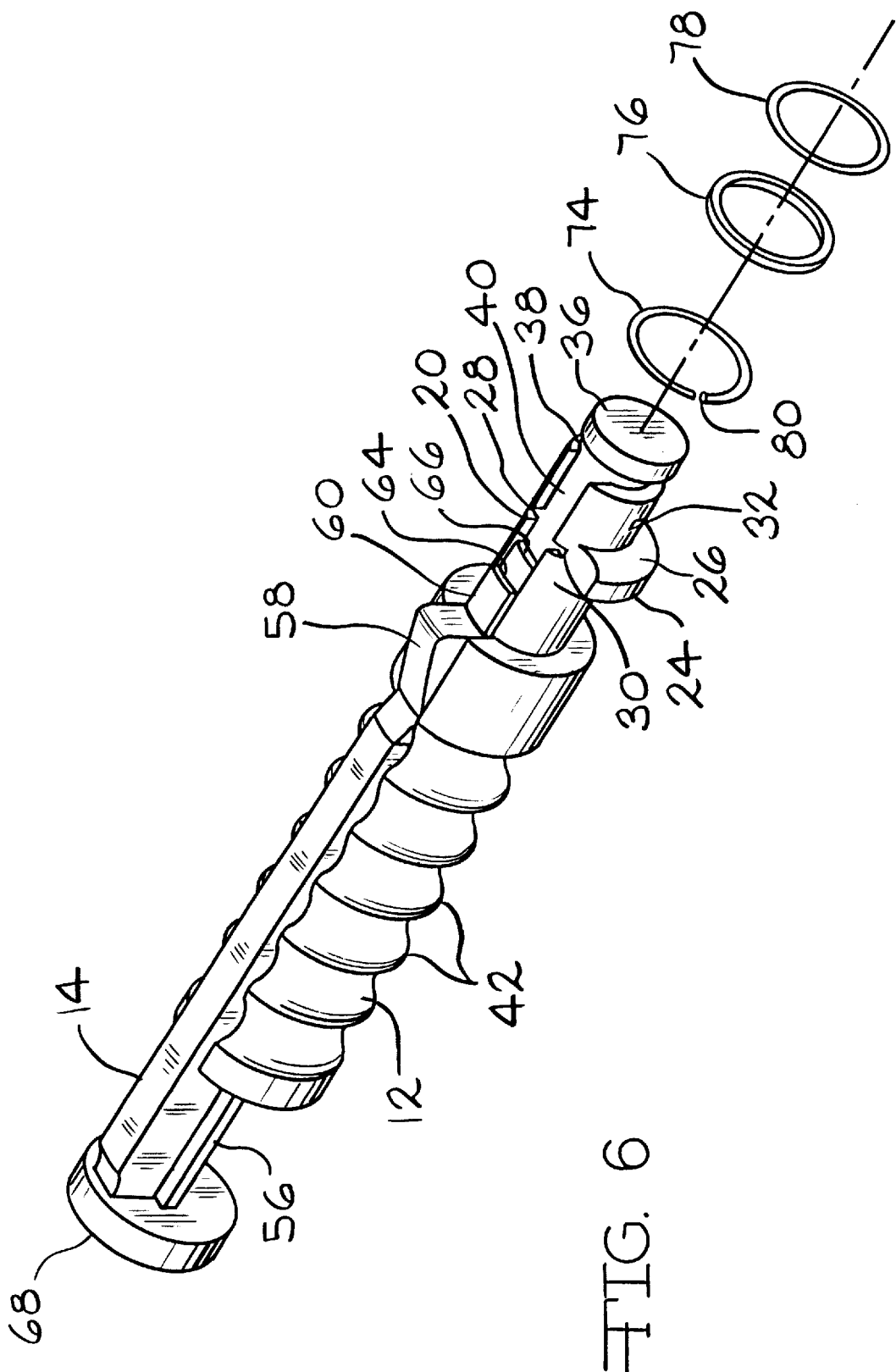
FIG. 6 is a perspective view showing the insertion tool according to the present invention, a retaining ring, a back-up ring and an O-ring.

Referring to FIGS. 6–10, the operation and intended use of the present invention will now be described. Referring to FIG. 6, the ring end 20 of the ring holder 12 is sized and adapted to receive a retaining ring 74, a back-up ring 76 and an O-ring 78. The retaining ring 74 is usually comprised of metal and includes a gap 80. The gap 80 allows the retaining ring 74 to expand and contract during insertion. The back-up ring 76 is usually comprised of TEFLON® material. The O-ring 78 is usually comprised of a suitable natural or synthetic elastomeric material. Both the back-up ring 76 and the O-ring 78 are flexible.

Figure 7:
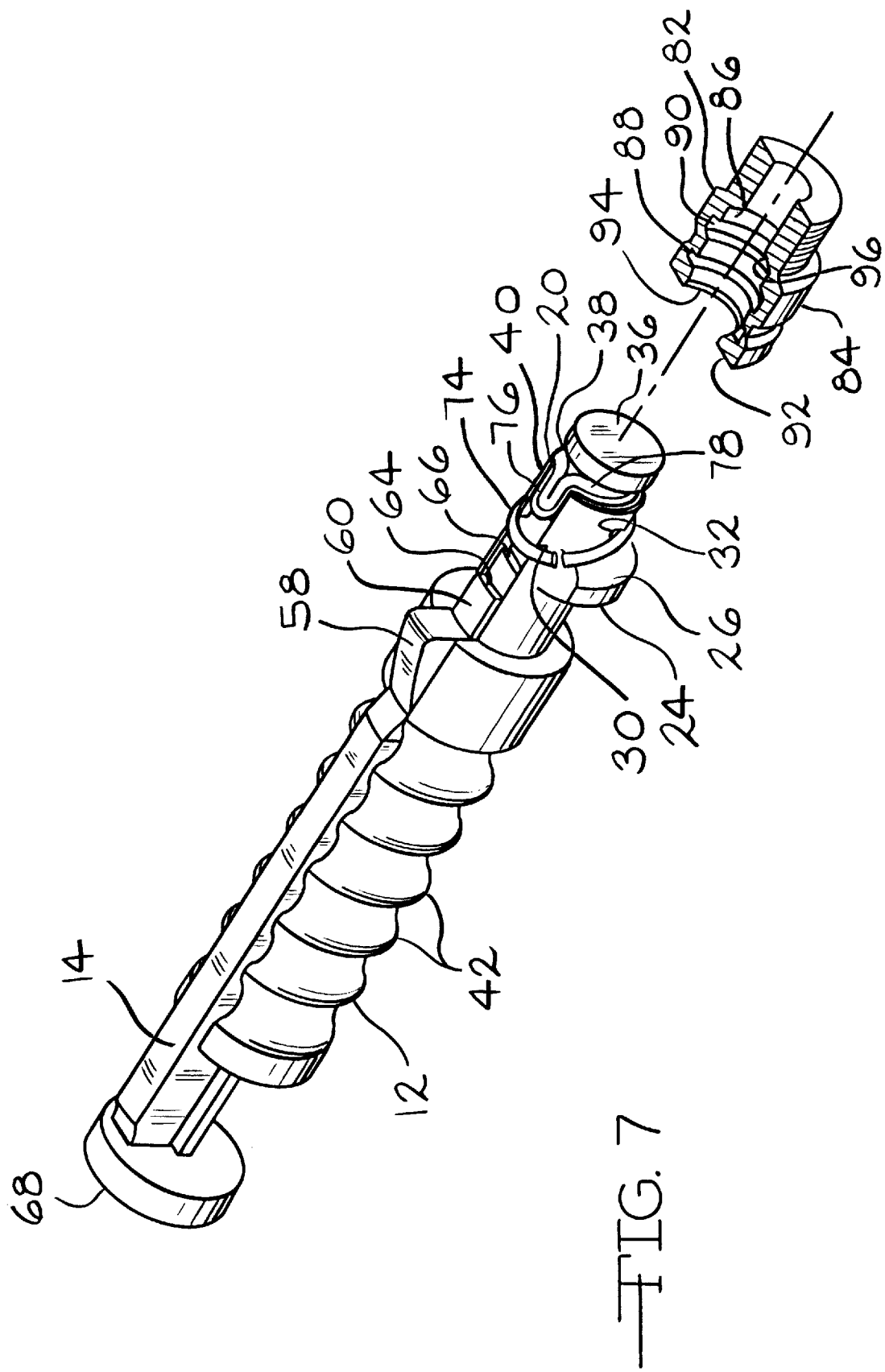
FIG. 7 is a perspective view similar to the view of FIG. 6 showing the insertion tool in relation to a body defining internal recesses for receiving the rings shown in cross-section.

Referring to FIG. 7, the retaining ring 74 is supported and positioned in the upper retaining grooves 28 and 30, the lower retaining groove 32 and the small rib 34. When so positioned, the retaining ring 74 is on an angle with respect to the ring end 20 of the ring holder 12. The back-up ring 76 and the O-ring 78 are supported and positioned in the diameter relief 38 of the ring end 20. After the retaining ring 74, the back-up ring 76 and the O-ring 78 are positioned on the ring end 20, the insertion tool 10 is positioned adjacent a body 82, such as a fluid fitting or coupling. The body 82 includes an exterior surface 84 and an interior surface 86. The interior surface 86 defines an internal retaining ring recess 88 and an internal back-up ring and O-ring recess 90. The retaining ring recess 88 and the back-up ring and O-ring recess 90 are sized and adapted to receive the retaining ring 74 and the back-up ring 76 and O-ring 78, respectively. The body 82 further includes a shoulder engagement end 92 defining a body opening 94. The shoulder engagement end 92 is sized and adapted to engage the body engagement surface 26 of the stationary shoulder 24. The body opening 94 is sized and adapted to receive the ring end 20 of the ring holder 12. The interior surface 86 of the body 82 further defines a body shoulder 96.

Figure 8:
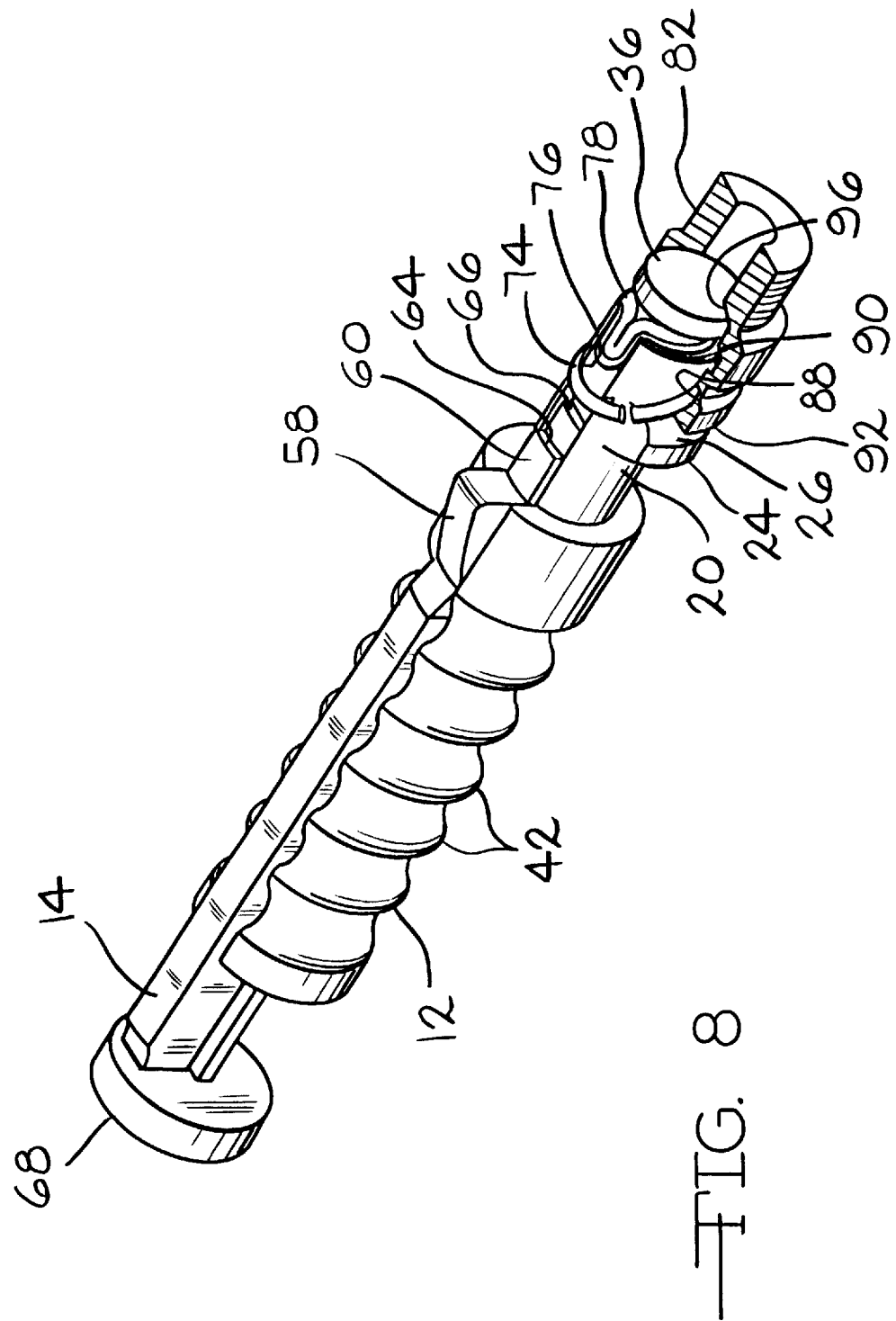
FIG. 8 is a view similar to the view of FIG. 7 showing insertion of the ring end of the ring holder into the body.

Referring to FIG. 8, the ring end 20 of the ring holder 12 is inserted in the body opening 94 of the body 82. The forward progress of the ring holder 12 is impeded when the body engagement surface 26 engages the shoulder engagement end 92. Prior to insertion, the back-up ring 76 and the O-ring 78 are manually folded into the relief area 40 and held in place. This allows the back-up ring 76 and the O-ring 78 to be inserted through the body opening 94 without the rings being pinched and thus possibly damaged by contact with the interior surface 86 of the body 82. Further, the angled positioning of the retaining ring 74 in relation to the body 82 allows the retaining ring to pass through the body opening 94 and into the interior of the body. When the ring end 20 has been fully inserted in the body 82, the retaining ring 74 is positioned adjacent the retaining ring recess 88 and the back-up ring 76 and the O-ring 78 are positioned adjacent the back-up ring and O-ring recess 90.

Figure 9:
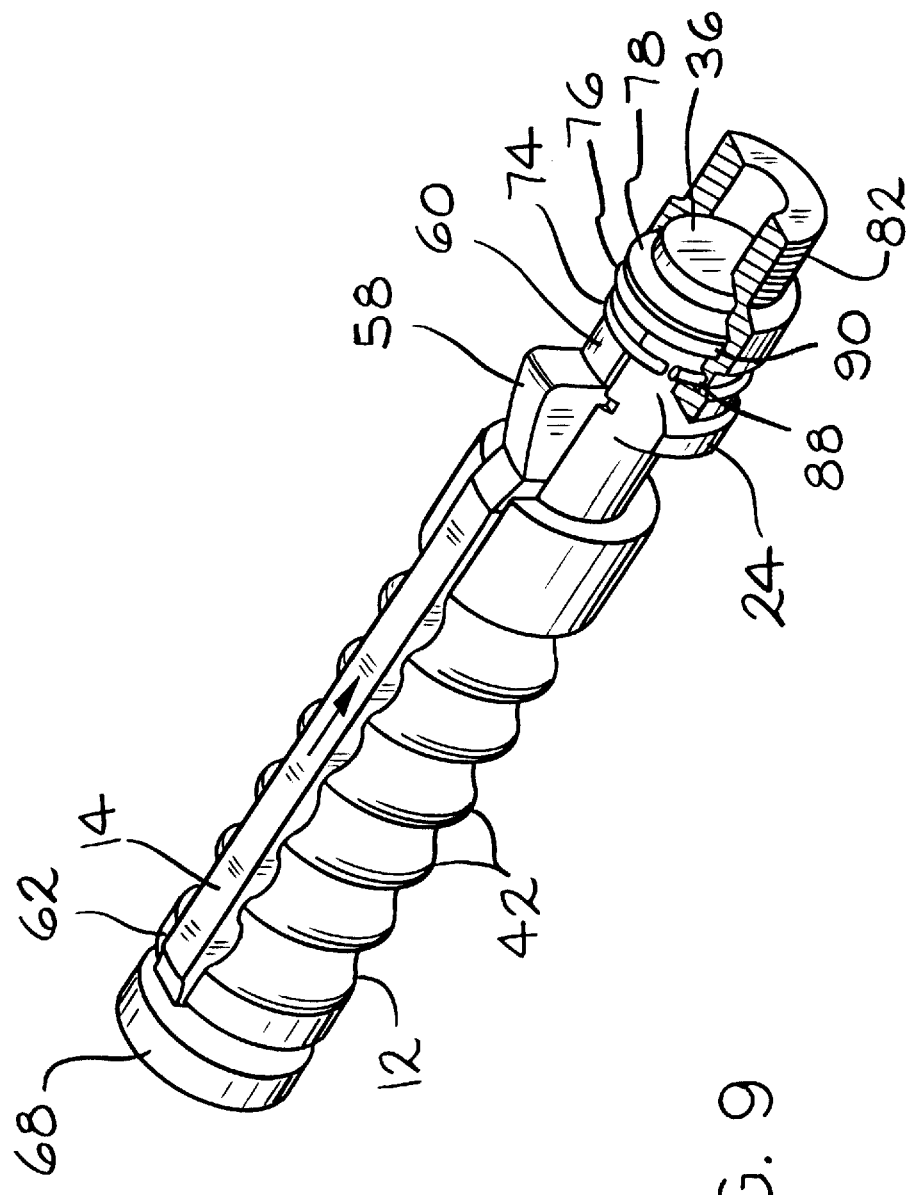
FIG. 9 is a view similar to the view of FIG. 8 showing insertion of the ring end of the ring holder into the body to position the rings in the internal recesses defined by the body.

Referring to FIG. 9, the plunger 14 is moved in the direction indicated by the arrow toward the ring end 20 of the ring holder 12. The plunger 14 can be actuated by engagement of the user's hand with the engagement projection 58 and the push plate 68. When the plunger 14 is moved, the retaining ring radius 64 engages the retaining ring 74 to move the retaining ring from the upper retaining grooves 28 and 30, the lower retaining groove 32 and away from the small rib 34 into the retaining ring recess 88 of the body 82. Simultaneously, the back-up and O-ring radius 66 of the plunger 14 engages the back-up ring 76 and the O-ring 78 to move and position the rings in the back-up ring and O-ring recess 90 of the body 82.

Figure 10:
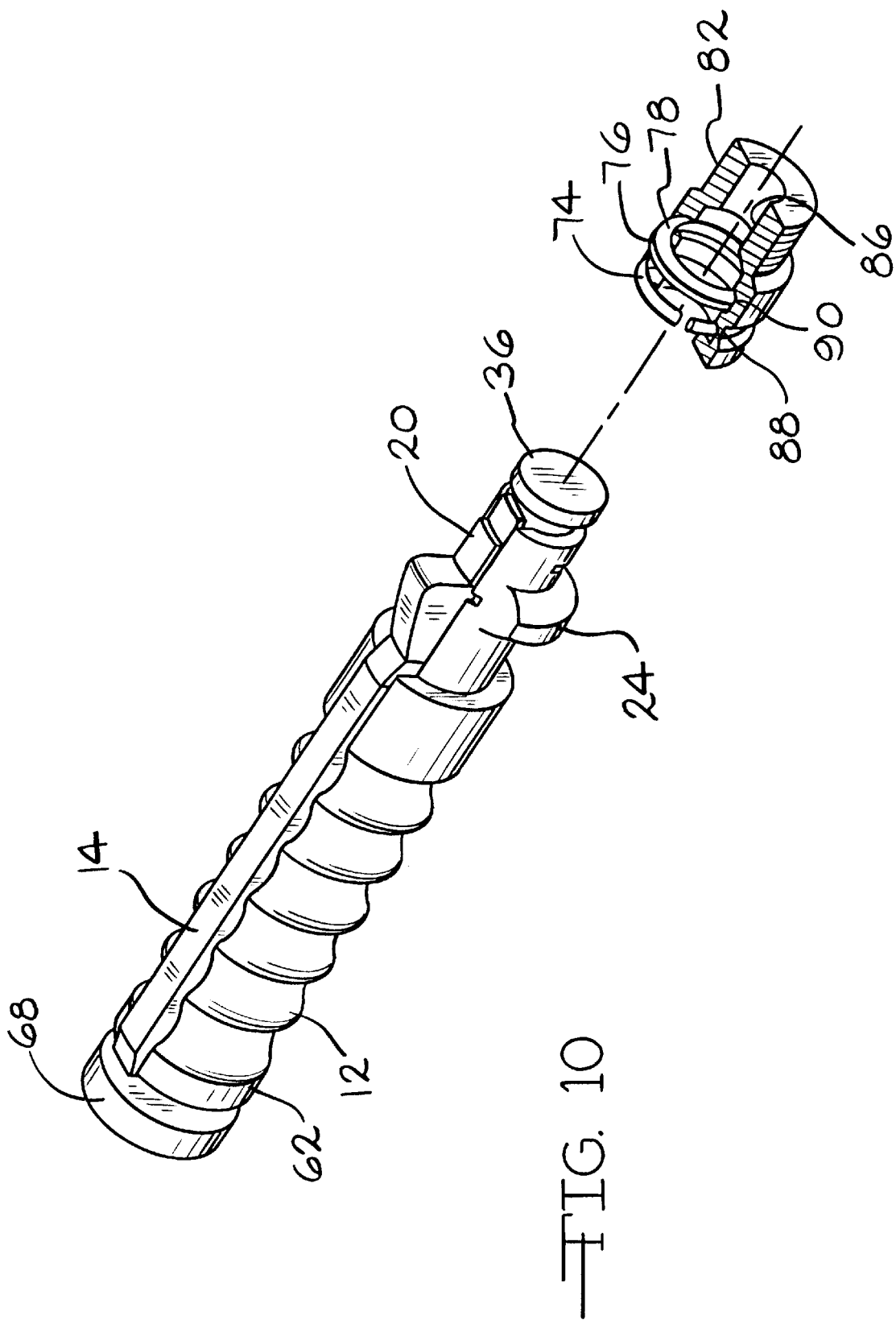
FIG. 10 is a view similar to the view of FIG. 9 showing the ring holder withdrawn from the body and the positioning of the retaining ring, the back-up ring and the O-ring in the internal recesses defined by the body.
Figure 11:
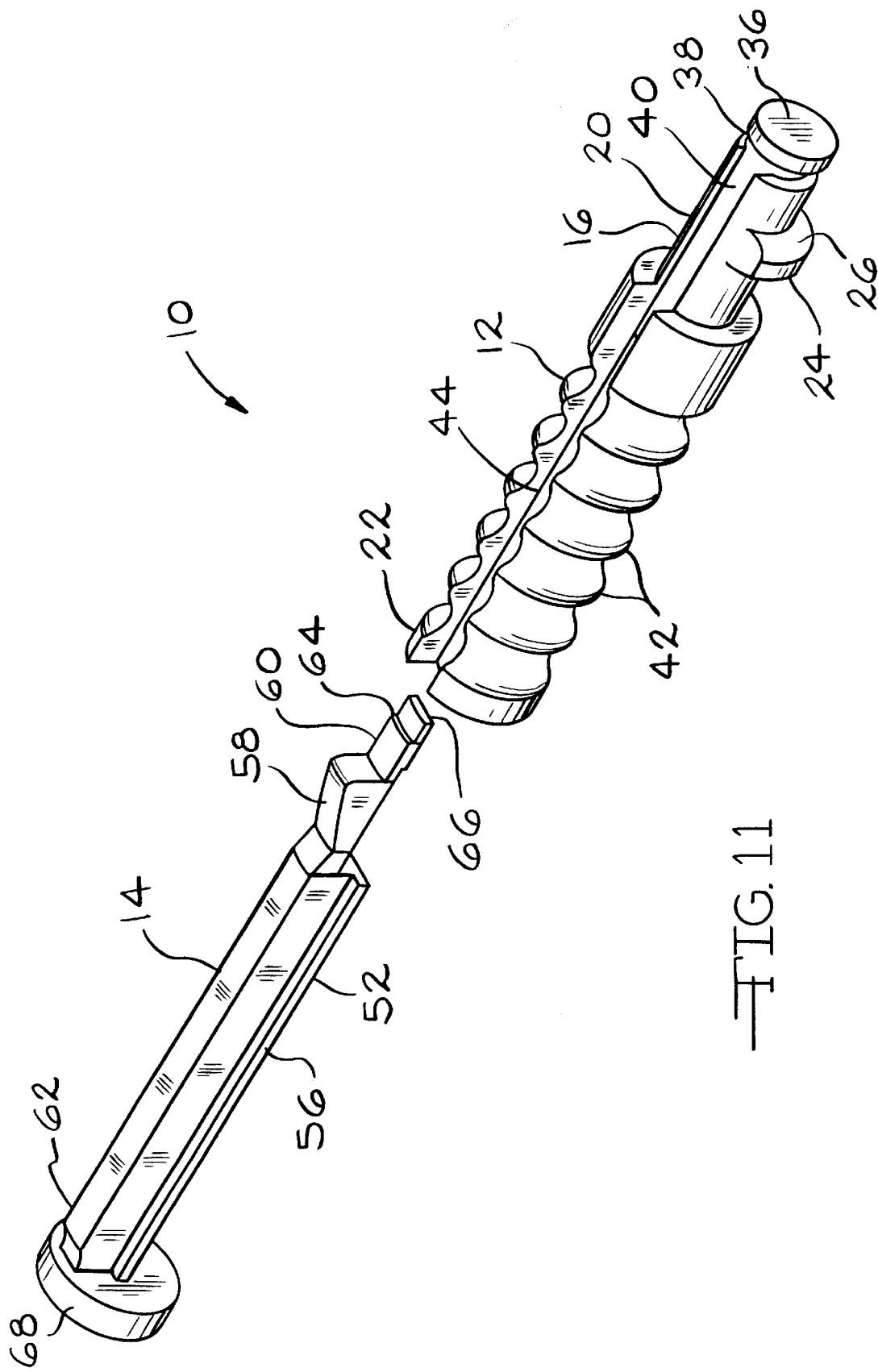
FIG. 11 is a perspective view of a second embodiment insertion tool according to the present invention in which the ring holder is separated from the plunger.
Figure 12:
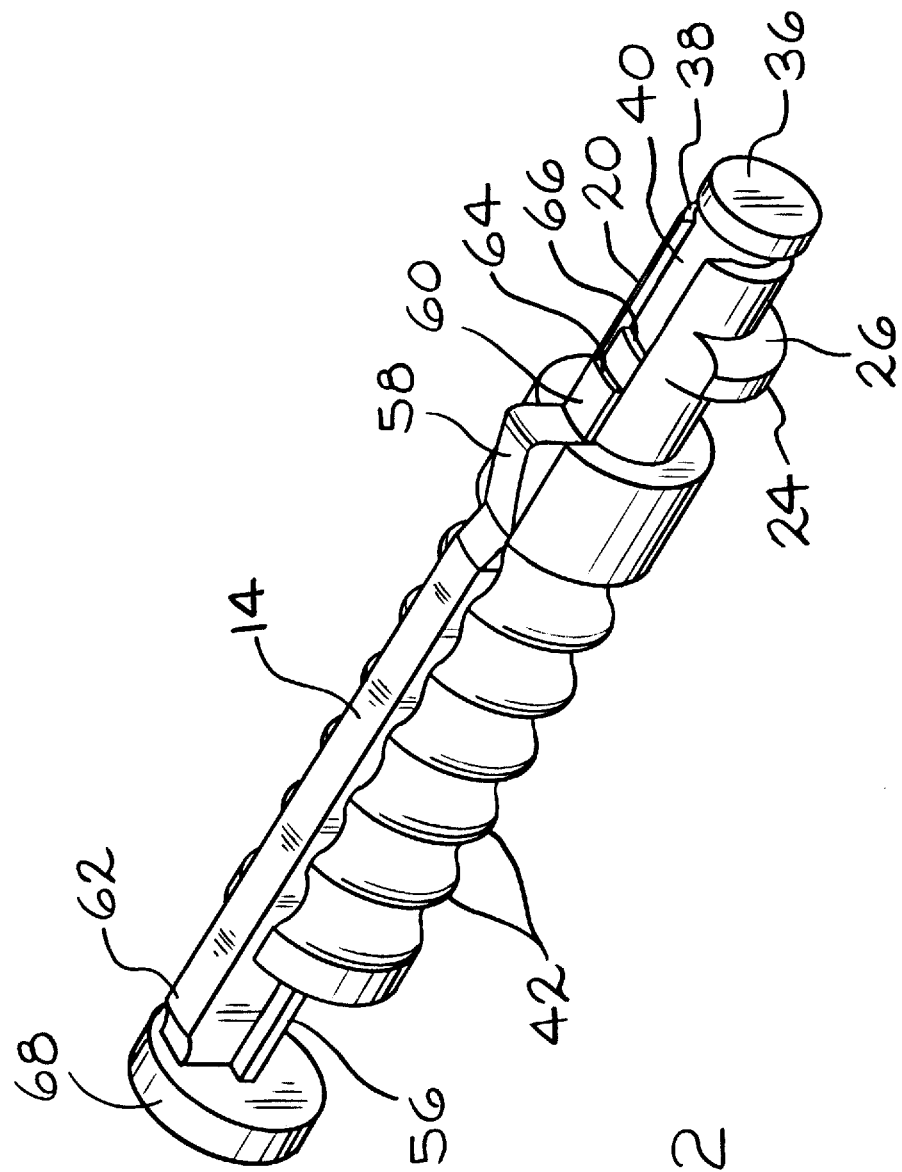
FIG. 12 is a perspective view showing the plunger inserted into the plunger channel defined by the ring holder.
Figure 16:
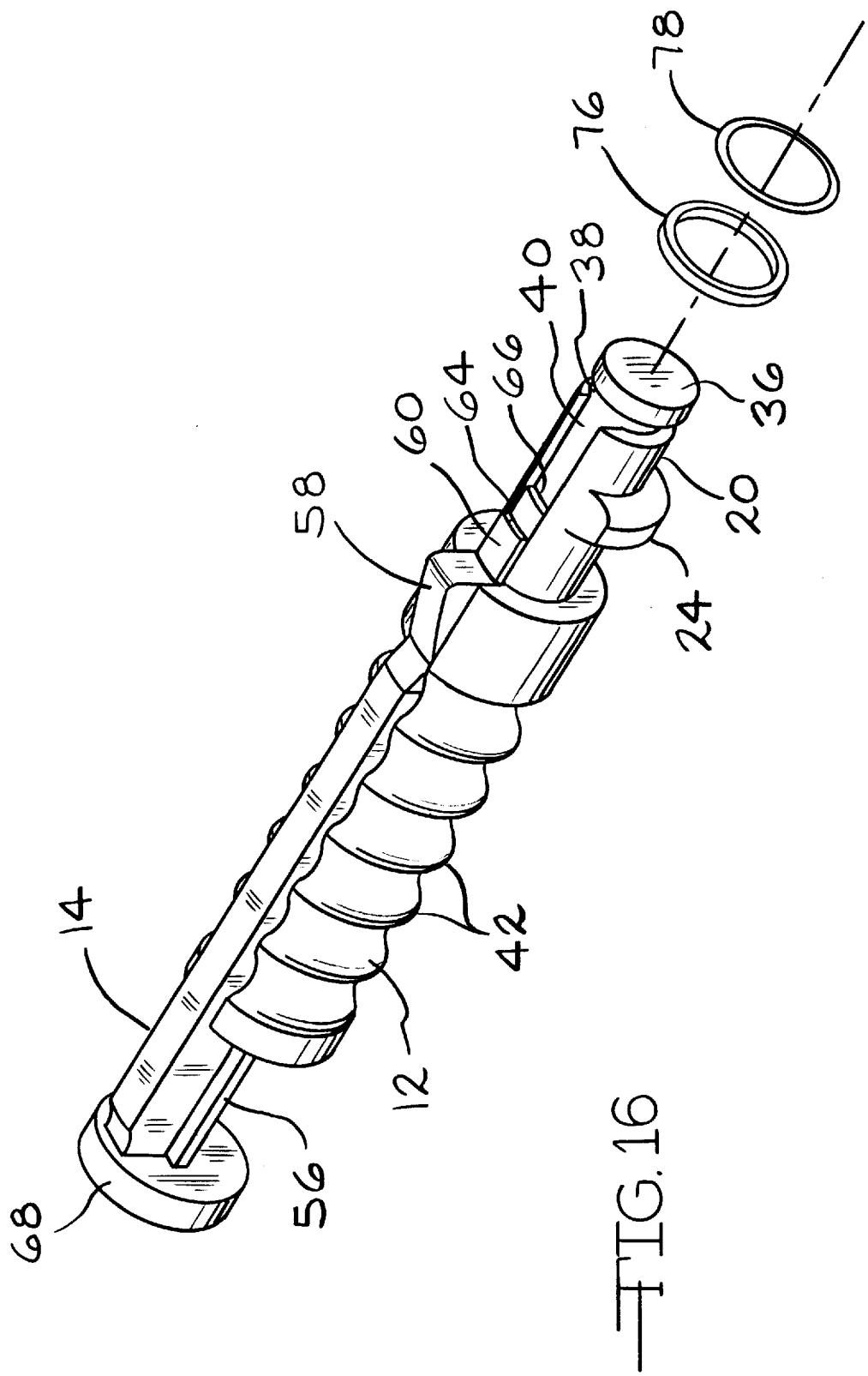
FIG. 16 is a perspective view similar to the view of FIG. 12 showing the insertion tool, a back-up ring and an O-ring.

Referring to FIG. 10, after the retaining ring 74, the back-up ring 76 and the O-ring 78 have been inserted in the body 82, the ring end 20 of the insertion tool 10 is withdrawn from the body opening 94 of the body 82. As it will be appreciated, the insertion tool 10 of the present invention quickly and efficiently inserts and positions the retaining ring 74, the back-up ring 76 and O-ring 78 within the internal recesses 88 and 90 of the body 82.

Figure 17:
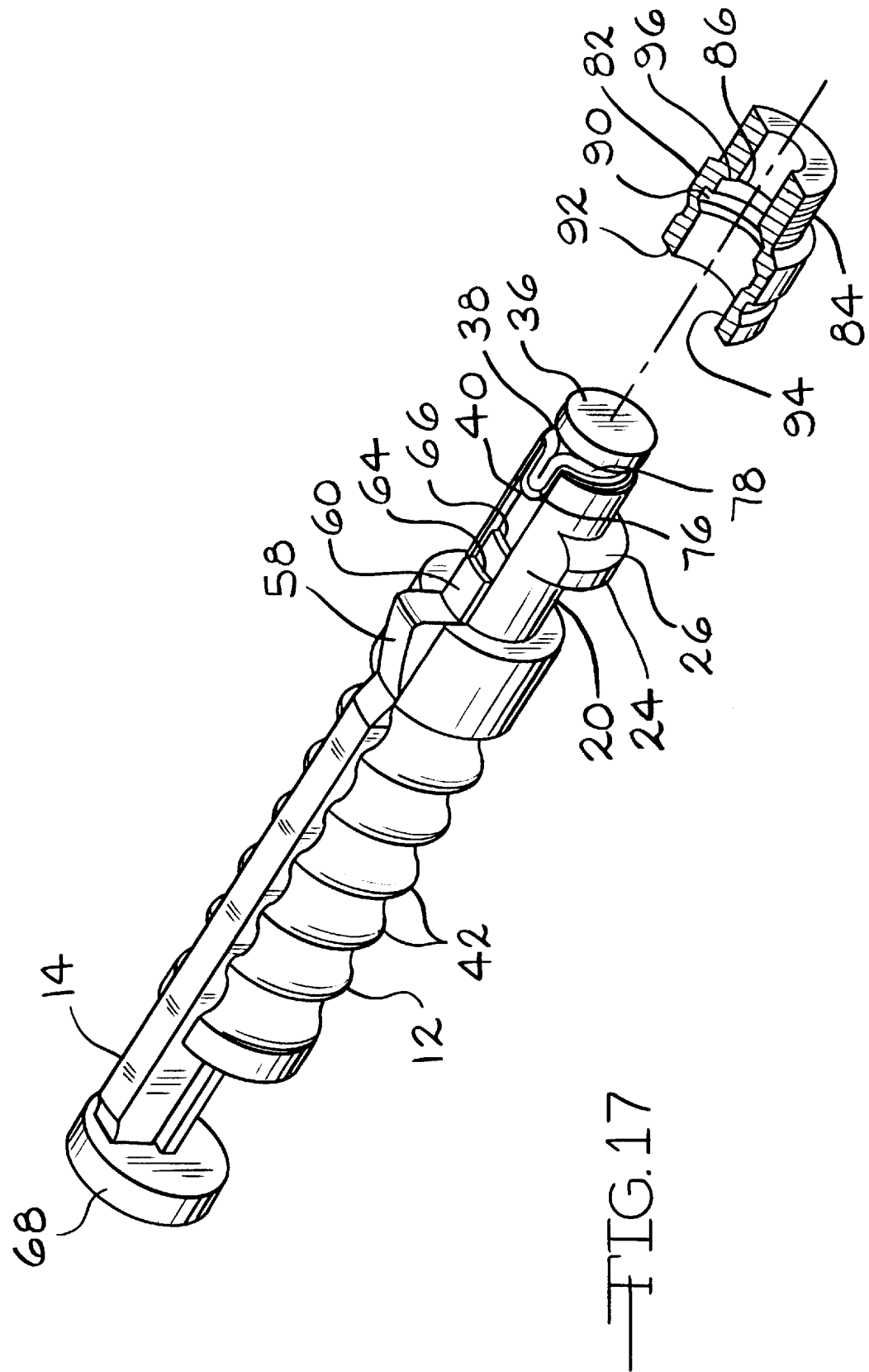
FIG. 17 is a perspective view similar to the view of FIG. 16 showing the insertion tool in relation to a body defining an internal recess for receiving the rings shown in cross-section.

Referring to FIGS. 11–20, the second embodiment insertion tool 10 is shown. The second embodiment insertion tool 10 includes all of the elements described above, such description being incorporated herein by reference, with the exception of the upper retaining grooves 28 and 30, the lower retaining groove 32 and the small rib 34 of the ring end 20 of the ring holder 12. The second embodiment insertion tool 10 is utilized to insert a back-up ring 76 and an O-ring 78 in a body 82. As shown in FIG. 17, the body 82 defines a back-up ring and O-ring recess 90 on the interior surface 86. The remainder of the body 82 includes those elements described above, such description being incorporated herein by reference.

Figure 18:
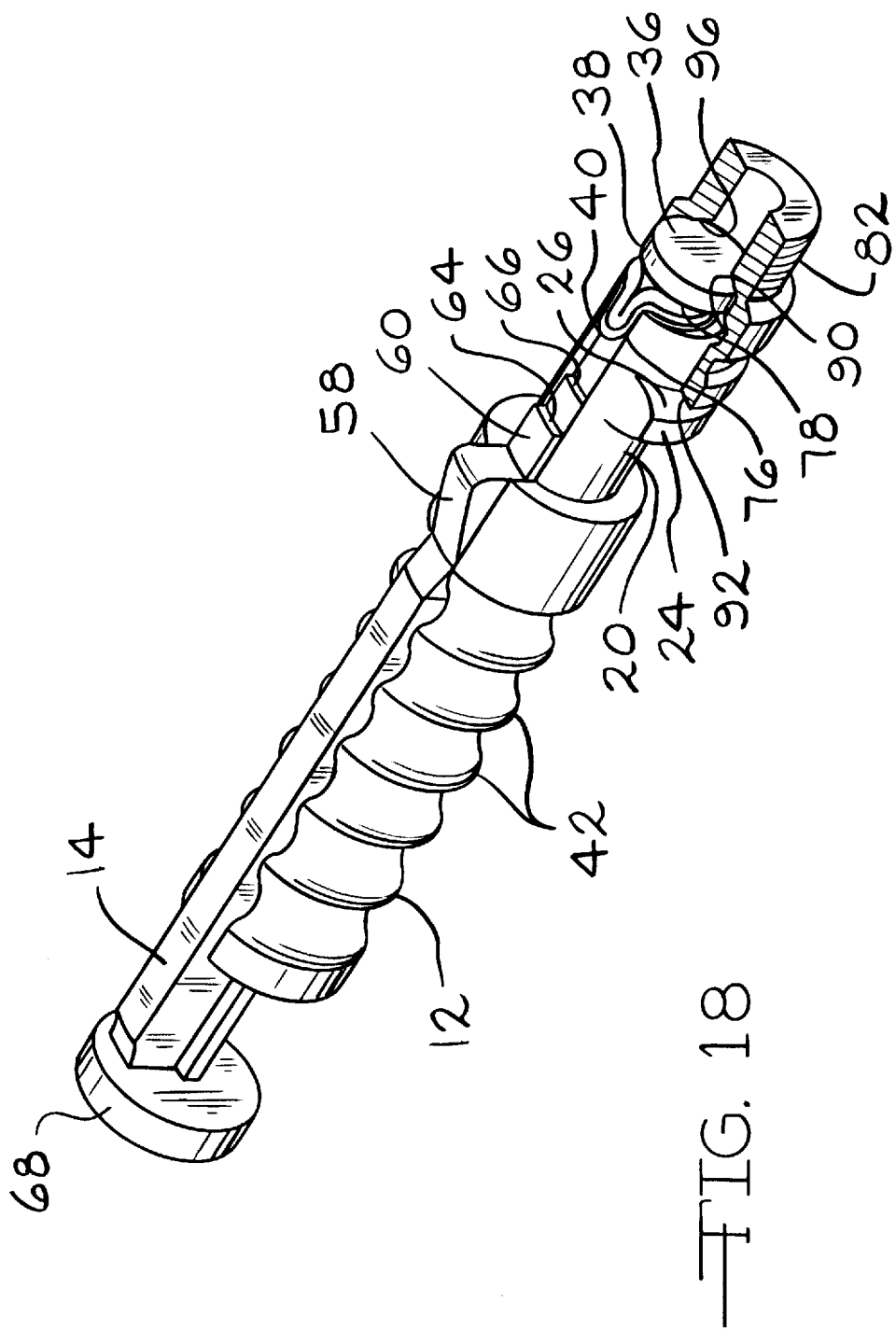
FIG. 18 is a perspective view similar to the view of FIG. 17 showing insertion of the ring end of the tool holder into the body.

Referring to FIG. 18, the ring end 20 of the insertion tool 10 is inserted in the body 82 through the body opening 94. The body engagement surface 26 of the stationary shoulder 24 engages the shoulder engagement end 92 of the body to impede the forward progress of the ring holder 12. In this position, the back-up ring 76 and the O-ring 78, which have been folded into the relief area 40 and held in place prior to insertion, are positioned adjacent the back-up and O-ring recess 90 of the body 82.

Figure 19:
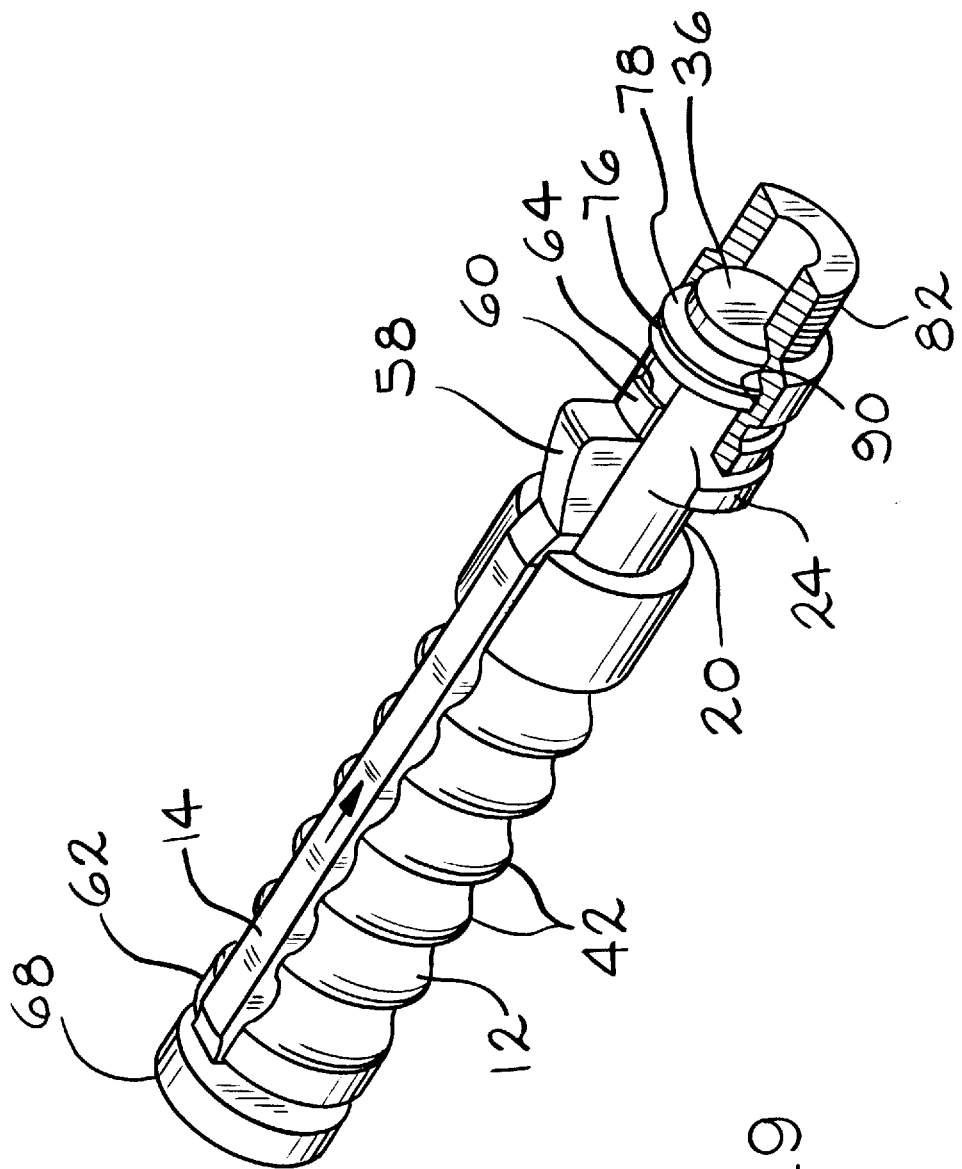
FIG. 19 is a perspective view similar to the view of FIG. 18 showing the rings being positioned in the internal recess defined by the body.

Referring to FIG. 19, the plunger 14 is moved in the direction indicated by the arrow. This results in the back-up and O-ring radius 66 of the radius end 60 of the plunger 14 engaging the back-up ring 76 and the O-ring 78 to position the rings in the back-up ring and O-ring recess 90.

Figure 20:
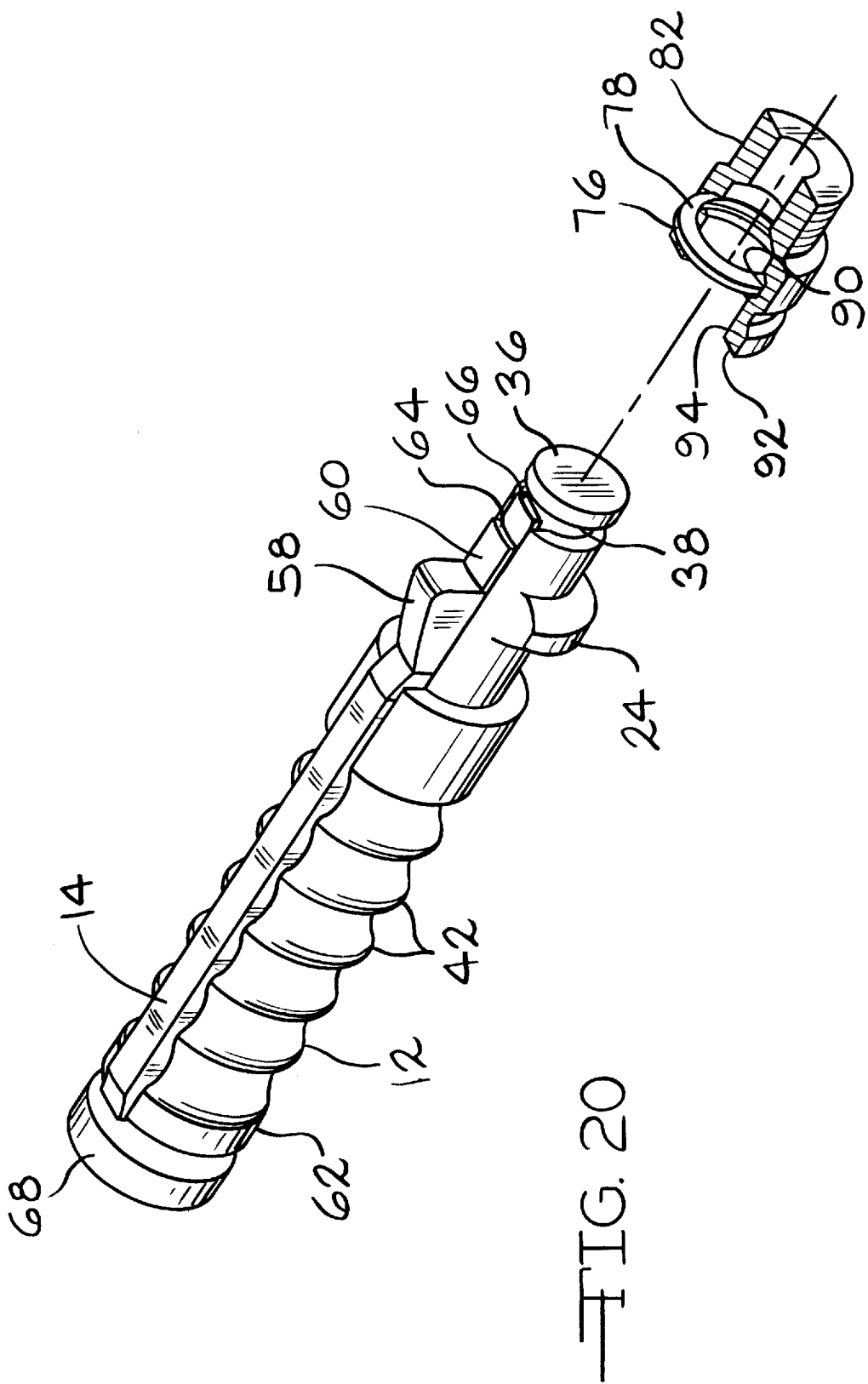
FIG. 20 is a perspective view similar to the view of FIG. 19 showing the insertion tool withdrawn from the body and the positioning of the back-up ring and the O-ring in the internal recess defined by the body.

Referring to FIG. 20, once the back-up ring 76 and the O-ring 78 are positioned in the back-up ring and O-ring recess 90, the ring end 20 of the insertion tool 10 is withdrawn from the body. The operation of the second embodiment insertion tool 10 quickly and efficiently positions the back-up ring 76 and the O-ring 78 in the body 82.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

I claim:

1. An insertion tool for insertion of a back-up ring and an O-ring into a body defining an internal recess for receiving said rings, comprising:

a ring holder having a top and a bottom extending longitudinally between a ring end and a handle end, said ring end including a stationary shoulder for engaging said body, said ring end defining a diameter relief adapted to receive and support said back-up ring and said O-ring, said ring holder defining a plunger channel extending longitudinally between said ring and handle ends along said top; and a plunger having an upper portion and a lower portion slidingly positioned in said plunger channel, said plunger having a radius end adjacent said ring end and an actuation end adjacent said handle end, said radius end including a back-up ring and an O-ring radius for engaging said back-up ring and said O-ring.

2. The tool of claim 1, wherein said ring end includes a tip.

3. The tool of claim 1, wherein said ring end defines a relief area.

4. The tool of claim 1, wherein said handle end includes a plurality of grips.

5. The tool of claim 1, wherein said upper portion of said plunger includes an engagement projection.

6. The tool of claim 1, wherein said lower portion of said plunger includes at least one flange for engaging said plunger channel.

7. The tool of claim 1, wherein said actuation end includes a push plate.

8. The tool of claim 1, wherein said ring holder and plunger are comprised of plastic.

* * * * *